United States Patent [19]

Isozumi et al.

[11] Patent Number: 4,868,442
[45] Date of Patent: Sep. 19, 1989

[54] DISK COMMUTATOR STARTER WITH ONE-PIECE CUP-SHAPED CASE

[75] Inventors: Shuzoo Isozumi; Kazuhiro Odawara; Toshinori Tanaka, all of Himeji, Japan

[73] Assignee: Mitsubishi Denki Kabushiki Kaisha, Tokyo, Japan

[21] Appl. No.: 166,513

[22] Filed: Mar. 9, 1988

[30] Foreign Application Priority Data

Mar. 10, 1987 [JP] Japan .............................. 62-35326[U]
Mar. 10, 1987 [JP] Japan .............................. 62-35327[U]

[51] Int. Cl.⁴ ...................... H02K 7/118; F16H 3/44; F02N 15/06
[52] U.S. Cl. ............................. 310/239; 123/179 M; 290/48; 310/89; 310/237
[58] Field of Search .............. 29/597; 290/48; 310/43, 310/237, 239, 247, 42, 89; 123/179 R, 179 M

[56] References Cited

U.S. PATENT DOCUMENTS

| | | | |
|---|---|---|---|
| 4,080,541 | 3/1978 | Mazzorana | 310/89 |
| 4,355,253 | 10/1982 | Vollbrecht | 310/239 |
| 4,519,261 | 5/1985 | Hamano | 74/7 E |
| 4,614,886 | 9/1986 | Schneider et al. | 310/239 |
| 4,671,125 | 6/1987 | Yabunaka | 290/48 |
| 4,695,735 | 9/1987 | Tallis, Jr. et al. | 290/48 |
| 4,816,712 | 3/1989 | Tanaka | 310/237 |

*Primary Examiner*—Patrick R. Salce
*Assistant Examiner*—D. L. Rebsch
*Attorney, Agent, or Firm*—Wolf, Greenfield & Sacks

[57] ABSTRACT

A starter used to start an engine of a vehicle includes an electric motor generating rotational force. The motor has an integrally formed cup-shaped casing one end of which is open, an armature disposed within the casing, a disk (or face) type commutator supported on a rotary shaft of the armature, and brush means having brushes pressed against a brush slide contact surface of the disk type commutator and a brush supporting member made of a resin material which retains the brushes axially slidably and which is rigidly secured to the closed end wall of the casing. Since the starter employs a disk type commutator, it is possible to accommodate the brushes in the brush supporting member together with the associated springs in one unit. Accordingly, the structure is simplified and the number of required parts is reduced considerably. Thus, assembly is extremely easy.

9 Claims, 5 Drawing Sheets

DISK COMMUTATOR STARTER WITH ONE-PIECE CUP-SHAPED CASE

BACKGROUND OF THE INVENTION

1. Field of the Invention

The present invention relates to a starter. More particularly, the present invention pertains to an improvement in an electric motor for generating rotational force in a starter used to start an engine of a vehicle.

2. Description of the Prior Art

A conventional starter used to start an engine of a vehicle has heretofore been arranged in the manner shown in FIG. 6.

The conventional starter 1 shown in FIG. 6, comprises a dc motor 2, an overruning clutch 4 slidably fitted on an output rotary shaft 3, an epicyclic reduction gear 5 which transmits the rotational force from an armature rotary shaft 2a of the dc motor 2 to a clutch outer member 4a of the overrunning clutch 4 through the output rotary shaft 3 after reducing the speed thereof, and a shift lever 8 having one end thereof engaged with the plunger rod of an electromagnetic switch 6 disposed at one side of the dc motor 2 and the other end thereof engaged with an annular member 7 secured to the overrunning clutch 4 in order to cause the overrunning clutch 4 to slide on the output rotary shaft 3.

In the conventional starter 1 of the type described above, a commutator 2b of the dc motor 2 consists of segments 2c circumferentially spaced at equal intervals to define with their peripheral surfaces a brush slide contact surface, and a resin portion for insulation which is provided between the segments 2c. More specifically, a tubular member 2d which has an insert 2e for use in a press-fitting buried in the inner peripheral surface and which has a multiplicity of segments 2c buried in the outer peripheral surface is formed of a resin material by integral molding process. Each segment 2c of the commutator 2b is connected at a riser portion 2h thereof to a lead wire of an armature coil 2g wound on an armature core 2f. A brush means 9 is disposed around the outer periphery of the commutator 2b. The brush means 9 includes a brush holder 9b which retains brushes 9a. Each brush 9a is biased radially inward of the commutator 2b from the outer side thereof by a spring 9c so as to be pressed against the brush slide contact surface defined by the peripheral surface of the commutator 2b.

Since in the conventional starter 1 the brushes 9a are pressed against the peripheral surface of the commutator 2b by the springs 9c, the process of assembly necessitates a step in which the springs 9c are expanded outward and, while this is being done, the brushes 9a are attached to the holder 9b. Accordingly, it is preferable to ensure that a space is left around the commutator 2b when assembling the brush means 9 with a view to facilitating the assembly. For this reason, the machine frame of the dc motor 2 is composed of a yoke 2i which surrounds the armature core 2f and a rear bracket 2j which is provided as a separate member to close the rear end of the yoke 2i. The rear bracket 2j is attached to the open end of the yoke 2i so as to close it after the brush means 9 has been mounted on the commutator 2b. The rear bracket 2j is then secured rigidly to a front bracket 11 by means of through bolts 10, and the brush holder 9b is secured rigidly to the bracket 2j by means of screws 12.

Accordingly, the conventional starter 1 needs an exceedingly large number of parts and has a complicated arrangement, and it therefore suffers from the problem that assembly is considerably complex and troublesome task.

SUMMARY OF THE INVENTION

In view of the above-described circumstances, it is a primary object of the present invention to provide a starter which has a simplified structure and a reduced number of required parts, as well as being easy to assemble.

To this end, the present invention provides a starter comprising an electric motor generating rotational force for starting an engine, the motor having an integrally formed cup-shaped casing, one end of which is open, an armature disposed within the casing, a disk commutator supported on a rotary shaft of the armature, and brush means having brushes pressed against a brush slide contact surface of the disk commutator and a brush supporting member made of a resin material which retains the brushes axially slidably and which is rigidly secured to the closed end wall of the casing.

Since the starter according to the present invention employs a disk commutator, it is possible to accommodate the brushes in the brush supporting member together with the associated springs in one unit. In assembling them, these members are first mounted on the armature rotary shaft and then inserted into the cup-shaped casing from the open end thereof. Thereafter, the casing is rigidly secured to a front bracket or the like, using securing means such as through bolts. In operation, when the power supply for the motor of the starter is turned on, the armature rotary shaft is rotated, and the rotation thereof is transmitted to a ring gear of an engine, thereby starting the engine.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

The starter according to the present invention will be described hereinunder in more detail by way of preferred embodiments and with reference to the accompanying drawings.

Figure 1:
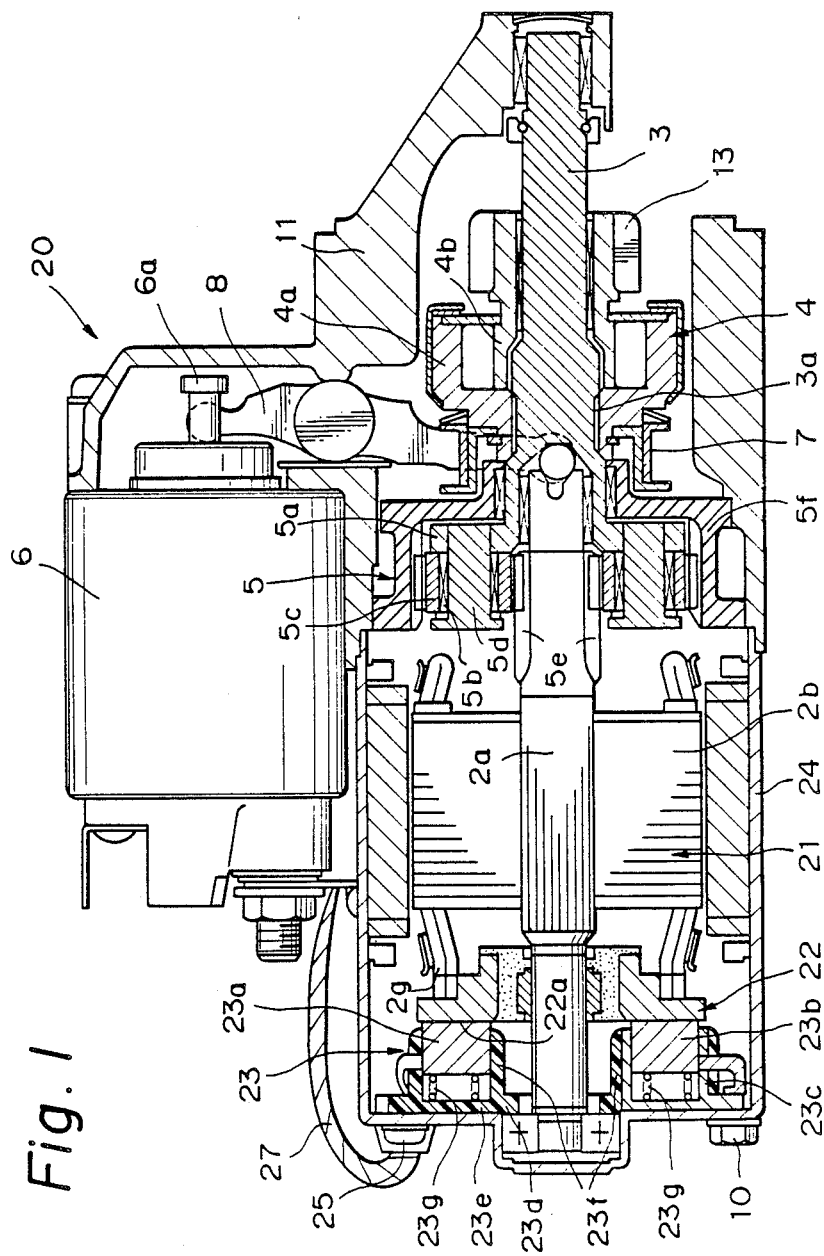
FIG. 1 is a sectional view of a starter according to one embodiment of the present invention.
Figure 2:
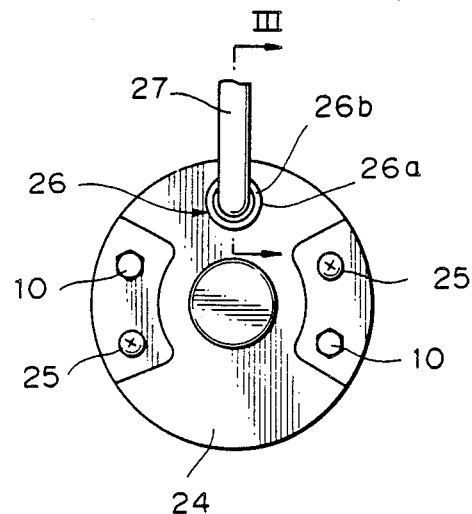
FIG. 2 is a side view showing the rear end of a DC motor employed in the starter shown in FIG. 1.
Figure 3:
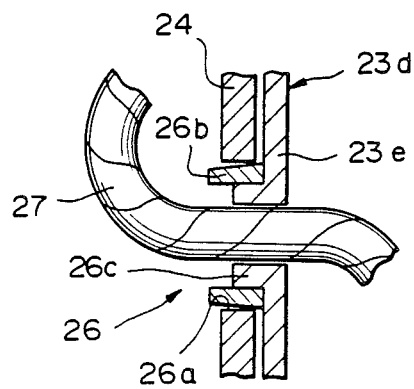
FIG. 3 is a fragmentary sectional view taken along the line III—III of FIG. 2, which shows a lead wire outlet portion.
Figure 6:
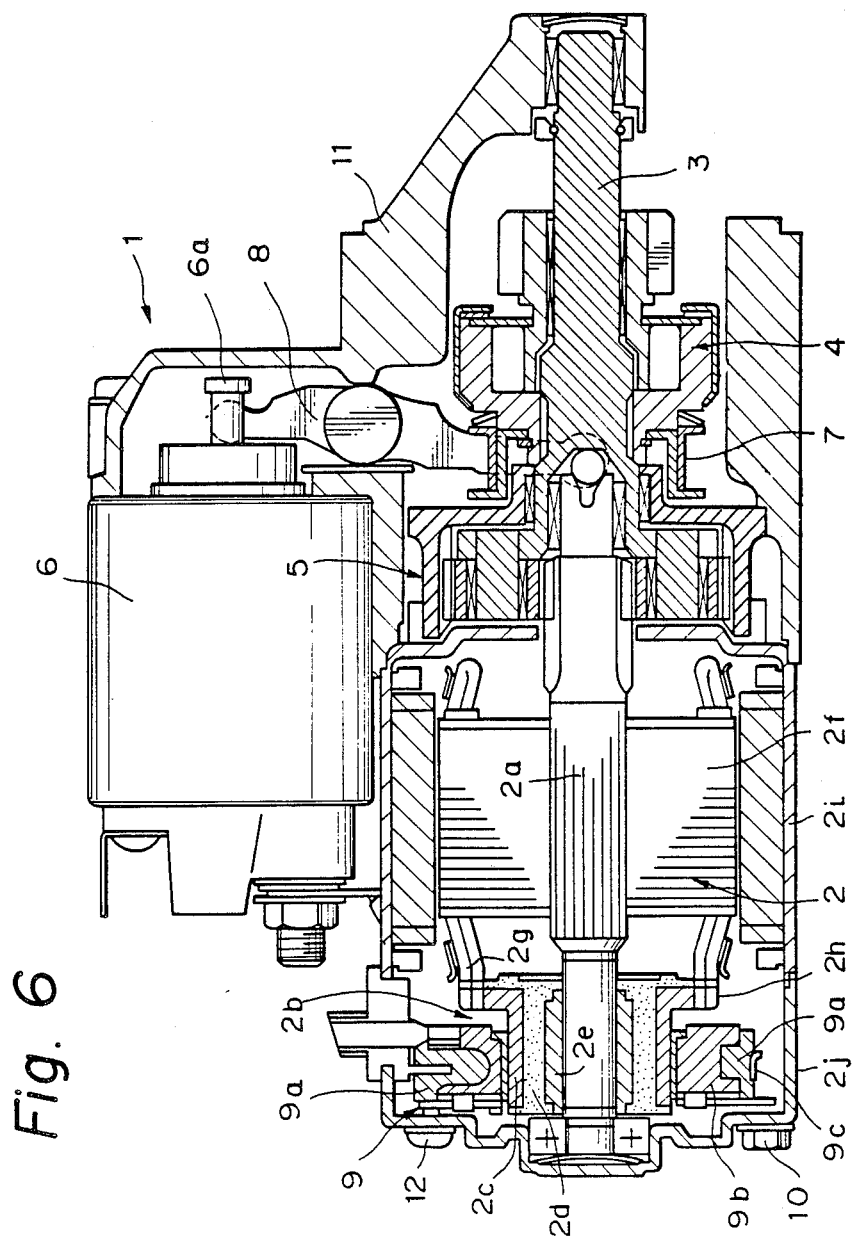
FIG. 6 is a sectional view of a conventional starter.

FIGS. 1 to 3 show in combination a starter 20 according to one embodiment of the present invention. In FIG. 1, elements or portions which are identical or equivalent to the constituent elements or portions of the conventional starter shown in FIG. 6 are denoted by the same reference numerals and description thereof is omitted.

The starter 20 of this embodiment has a dc motor 21 which generates rotational force for starting an engine. The dc motor 21 includes an armature rotary shaft 2a and an armature core 2b fitted on the rotary shaft 2a in the same way as in the prior art. A disk commutator 22 is fitted on one end portion of the armature rotary shaft 2a, and a brush means 23 is disposed adjacent to the commutator 22. The armature rotary shaft 2a and members which are fitted thereon, together with the brush means 23, are accommodated in a cup-shaped casing 24 one end of which is open. Accordingly, the casing 24 functions as both a yoke and a machine frame of the dc motor 21.

The disk commutator 22 has a sliding contact surface 22a defined by a vertical surface which extends perpendicularly to the axis of the rotary shaft 2a, the sliding contact surface 22a being in sliding contact with brushes 23a, 23b of the brush means 23 (described later in detail). The commutator 22 consists of a multiplicity of commutator segments which are insulated form each other by a synthetic resin material. Each segment is connected to a terminal portion of an armature coil 2g which is led out from the armature core 2b. The brush means 23 has a plus-side brush 23a and a minus-side brush 23b which are axially slidably retained by a brush supporting member 23d made of a resin material in such a manner that the plus-side brush 23a is supported directly by the brush supporting member 23d, while the minus-side brush 23b is supported thereby through a metallic holder portion 23c. More specifically, the brush supporting member 23d has a base plate 23e which is positioned so as to extend perpendicularly to the axis of the armature rotary shaft 2a and two retaining tubular portions 23f which are formed integral with the base plate 23e so as to open toward the face of the commutator 22, i.e., the brush slide contact surface 22a. The plus-side brush 23a is slidably accommodated in one retaining tubular portion 23f, while the above-described metallic holder portion 23c is entirely accommodated and rigidly secured in the other retaining tubular portion 23f. The brushes 23a and 23b are pressed against the brush slide contact surface 22a of the commutator 22 by respective coil springs 23g which are disposed in the retaining tubular portion 23f and the holder portion 23c, respectively. Further the wall of the closed rear end of the casing 24 is provided with an outlet 26 for a lead wire, as shown in FIG. 3. The outlet 26 includes a bore 26a provided in the casing 24, a ring-shaped rubber bush 26b fitted in the bore 26a, and a circular projection 26c which is formed on the base plate 23e of the brush supporting member 23d such that the projection 26c is fitted into the rubber bush 26b. The circular projection 26c formed on the base plate 23e has an outlet opening which is provided in its central portion to allow a lead wire 27 to be led out therethrough.

The above-described arrangement enables the brush means 23 to be completely unitized. Accordingly, when the dc motor 21 is to be assembled, the brush means 23 is first placed in the above-described casing 24, and the base plate 23e of the brush supporting member 23d is positioned on the closed end wall of the casing 24 in such a manner that the projection 26e is fitted into the bore 26a. Then, the base plate 23e is secured by means of screws 25, and the lead wire 27 which is connected to the brush 23a is led out of the casing 24 through the bore provided in the brush supporting member 23d. Then, the armature rotary shaft 2a having the commutator 22 and the armature core 2b rigidly fitted thereon is inserted into the casing 24.

An epicyclic reduction gear 5 and an overrunning clutch 4 are disposed forward (i.e., rightward as viewed in FIG. 1) of the dc motor 21 in the same way as in the prior art. More specifically, the epicyclic reduction gear 5 has a carrier 5a which is formed integral with the output rotary shaft 3, pins 5d each rigidly secured at one end thereof to the carrier 5a for rotatably carrying a planet gear 5c through a bearing 5b, a sun gear 5e which is generated in the peripheral surface of the distal end portion of the armature rotary shaft 2a, and an internal gear 5f which is fixedly disposed around the sun gear 5e.

The operation of the starter 20 will next be briefly explained. When the electromagnetic switch 6 is energized, the shift lever 8 is pivoted and the overrunning clutch 4 is thereby shifted forwardly, with the clutch outer member 4a being kept engaged with the helical spline 3a provided in the outer peripheral surface of the output rotary shaft 3. As a result, the pinion 13 which is provided on the clutch inner member 4b is meshed with a ring gear (not shown) of an internal combustion engine. Immediately before, or at substantially the same time as the pinion 13 is meshed with the ring gear, the main contacts of the electromagnetic solenoid 6 are closed, so that the power supply of the dc motor 21 is turned on and the armature rotary shaft 2a thus starts rotating. The rotation of the armature rotary shaft 2a causes the planet gears 5c to revolve through the sun gear 5e formed on the rotary shaft 2a. Thus, the rotation of the armature rotary shaft 2a is transmitted to the output rotary shaft 3 after the speed of rotation has been reduced by inner deceleration, and the rotation is further transmitted from the output rotary shaft 3 to the clutch outer member 4a of the overrunning clutch 4 through the helical spline 3a. As a result, the engine is started by the rotation of the pinion 13 which rotates together with the clutch inner member 4b. It should be noted that the reverse transmission of rotational force to the armature rotary shaft 2a after the starting of the engine is cut off by the overrunning clutch 4.

Figure 4:
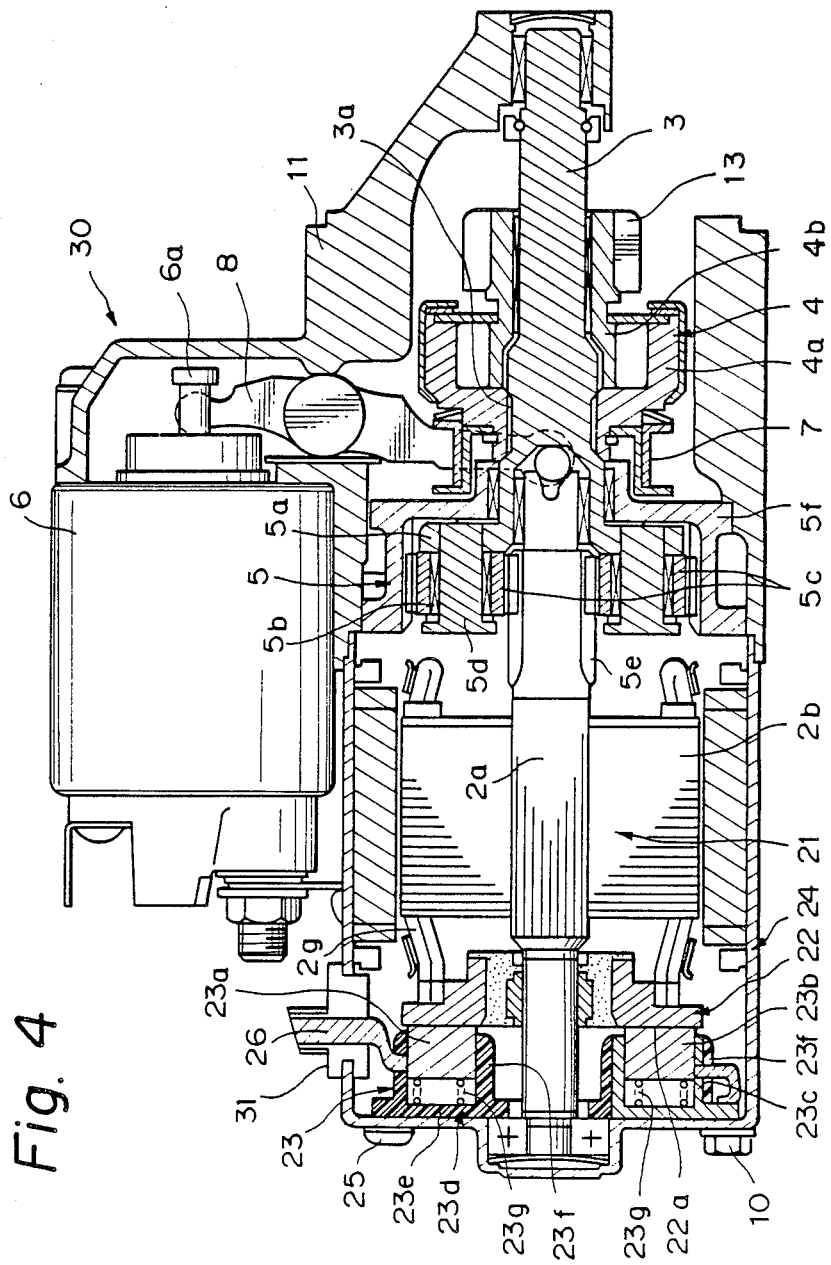
FIGS. 4 and 5 are sectional views respectively showing starters according to other embodiments of the present invention.

FIG. 4 shows a starter 30 according to another embodiment of the present invention. Since the starter 30 of this embodiment differs from the embodiment shown in FIG. 1 only in the structure provided for attachment of the lead wire 27, the same elements or portions are denoted by the same reference numerals and description thereof is omitted. In this embodiment, the lead wire 27 which is connected to the brush 23a is led out of the casing 24 through an outlet 31 which is formed by fitting a rubber bush into a bore provided in the peripheral surface portion of the casing 24.

Figure 5:
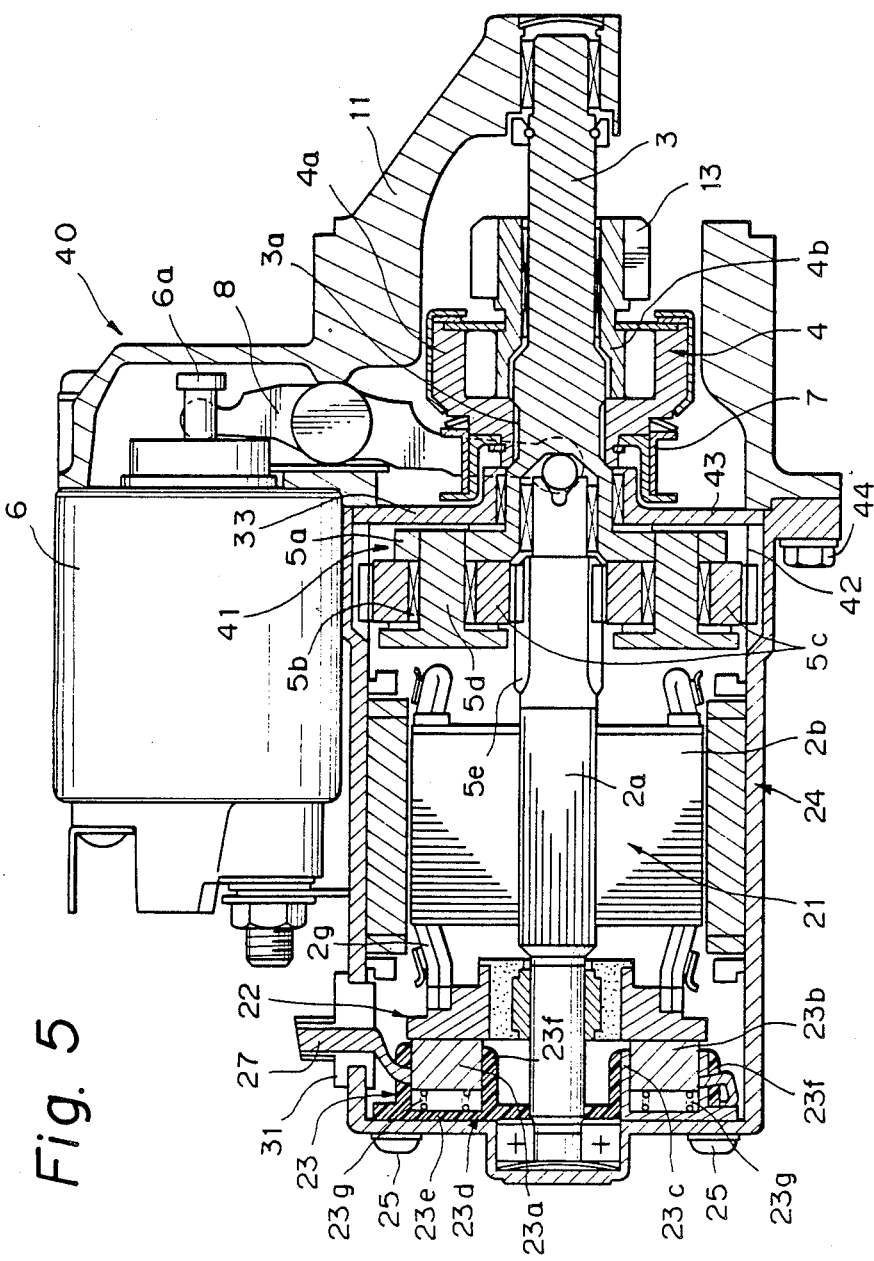

FIG. 5 shows a starter 40 according to still another embodiment of the present invention. Since the starter 40 of this embodiment differs from the embodiment shown in FIG. 4 only in the structure of an epicyclic reduction region 41, the same elements or portions are denoted by the same reference numerals and description thereof is omitted. The epicyclic reduction gear 41 in this embodiment has an internal gear portion 42 which is defined by an internal gear generated in the inner peripheral surface of the open end portion of the casing 24 of the dc motor 21. This embodiment is the same as the second embodiment shown in FIG. 4 except for the above-described arrangement. Thus, unlike the second embodiment, which needs an internal gear as a separate member, this embodiment has the internal gear portion 42 which is formed integral with the casing 24 of the dc motor 21 and therefore enables the number of required parts to be reduced by one. It should be noted that, in FIG. 5, the reference numeral 43 denotes a center bracket which is disposed at the open end of the casing 24 and the numeral 44 denotes a bolt for securing the front bracket 11 to a flange which is formed at the open end of the casing 24.

Although in the above-described three embodiments the starter is equipped with an epicyclic reduction gear, the present invention is not necessarily limited to this type of starter but may, of course, be applied to starters having other types of reduction gear or having no reduction gear at all.

As has been described above, starter according to the present invention employs a disk commutator and therefore enables the brush means to be unitized advantageously. As a result, it is possible to employ a cup-shaped motor casing one end of which is closed. Accordingly, the structure is simplified and the number of required parts is reduced considerably. Thus, assembly is extremely easy.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A starter for starting an engine, said starter comprising:
    a one-piece cup-shaped casing having an open end and a closed end, said closed end having an outer surface and an inner surface;
    an armature disposed within said casing, said armature having a rotary shaft with an axis;
    a disk commutator mounted on said shaft having a commutator segments disposed perpendicular to said axis;
    at least two electrical contact brushes;
    means mounted on said inner surface of said closed casing end for slidably holding said brushes parallel to said axis; and
    means for urging said brushes against said commutator segments so that said brushes make electrical contact with said commutator segments when said armature is inserted into said casing.

2. A starter comprising an electric motor generating rotational force for starting an engine, said motor having an integrally formed cup-shaped casing one end of which is open, an armature disposed within said casing, a disk commutator supported on a rotary shaft of said armature, and brush means having brushes pressed against a brush sliding contact surface of said disk commutator and a brush supporting member made of a resin material which retains said brushes axially slidably and which is rigidly secured to the closed end wall of said casing, and wherein said brushes include plus-side and minus-side brushes which are axially slidably retained by said brush supporting member directly and through a metallic holder portion, respectively.

3. A starter according to claim 2, wherein said motor further has an outlet for leading a lead wire connected to said plus-side brush out of said cup-shaped casing, said outlet being composed of outlet openings respectively provided in the closed end wall of said casing and said brush supporting member.

4. A starter according to claim 2, wherein an outlet for leading a lead wire connected to said plus-side brush out of said cup-shaped casing is provided in the peripheral surface portion of said casing.

5. A starter according to claim 1 further comprising a bearing mounted on said closed casing end, said bearing engaging and supporting said rotary shaft when said armature is inserted into said casing.

6. A starter according to claim 1 wherein said casing open end has an inner surface and said starter further comprises an epicyclic reduction gear for transmitting torque from said starter to said engine, said reduction gear comprising a planet gear, a sun gear and an internal gear, said internal gear being integrally formed on said inner surface of said casing open end.

7. A starter according to claim 1 wherein said brush holding means is comprised of an insulating material.

8. A starter according to claim 7 wherein said brush holding means is comprised of a resinous material.

9. A starter according to claim 7 wherein said casing closed end is provided with a hole to allow a lead wire connection to said brushes and wherein an annular projection is formed on said brush holding means which annular projection fits into said hole and insulates said lead wire from said closed casing end.

* * * * *